(12) United States Patent
Teal et al.

(10) Patent No.: US 11,349,950 B1
(45) Date of Patent: May 31, 2022

(54) REMOTELY INTERACTING WITH DATABASE

(71) Applicant: Nationwide Mutual Insurance Company, Columbus, OH (US)

(72) Inventors: Ryan Teal, Pickerington, OH (US); Michael J. Butcher, Galena, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 0 days.

(21) Appl. No.: 16/669,585

(22) Filed: Oct. 31, 2019

Related U.S. Application Data

(60) Provisional application No. 62/753,215, filed on Oct. 31, 2018.

(51) Int. Cl.
| | | |
|---|---|---|
| *H04L 67/5683* | (2022.01) | |
| *H04L 67/5682* | (2022.01) | |
| *H04L 67/01* | (2022.01) | |
| *H04L 67/04* | (2022.01) | |
| *G06F 16/16* | (2019.01) | |

(52) U.S. Cl.
CPC ........ *H04L 67/2857* (2013.01); *G06F 16/168* (2019.01); *H04L 67/04* (2013.01); *H04L 67/2852* (2013.01); *H04L 67/42* (2013.01)

(58) Field of Classification Search
CPC .. G06F 3/0482; G06F 3/04842; G06F 16/683; G06F 16/168; G06F 16/955; G06F 16/903; G06F 21/35; H04L 67/22; H04L 67/02; H04L 67/04; H04L 67/20; H04L 67/42; H04L 67/2857; H04L 67/2852; H04L 63/083; H04L 2209/80; H04L 5/006; H04L 67/2842; H04W 12/068; H04W 12/33; H04W 12/37; H04W 76/10; H04W 36/30; H04W 92/18; H04W 48/18; H04W 76/15; H04W 36/305; H04W 40/248; H04B 17/318
See application file for complete search history.

(56) References Cited

U.S. PATENT DOCUMENTS

| | | | |
|---|---|---|---|
| 10,684,738 B1 * | 6/2020 | Sicora .................... | G06F 16/435 |
| 10,771,458 B1 * | 9/2020 | Xia ........................ | H04W 12/06 |
| 2004/0225681 A1 * | 11/2004 | Chaney .................... | G06F 16/40 |
| 2008/0032739 A1 * | 2/2008 | Hoodbhoy ............. | G06Q 10/06 455/556.2 |

(Continued)

*Primary Examiner* — Tonia L Dollinger
*Assistant Examiner* — Linh T. Nguyen
(74) *Attorney, Agent, or Firm* — Thomas E. Lees, LLC

(57) ABSTRACT

A process and system that allows a user with a mobile device to interact with a remote database includes wirelessly coupling the mobile device to the database over a wireless network using a username. Based on the username, and in some cases a role associated with the username, the database transmits a set of data records to the mobile device in one or more subsets of data records. The user selects one of the records and provides an update that includes an item of some sort (e.g., a photograph, a note to the record, etc.). However, the user cannot delete anything associated with the record. If the update can be transmitted to the database, then the mobile device transmits the update. However, if the update cannot be transmitted, then the update is stored for a later transmission. Once the update is transmitted, it is deleted from the mobile device.

16 Claims, 3 Drawing Sheets

(56) References Cited

U.S. PATENT DOCUMENTS

| | | | | |
|---|---|---|---|---|
| 2008/0039058 | A1* | 2/2008 | Ray | H04L 69/24 |
| | | | | 455/414.3 |
| 2013/0332216 | A1* | 12/2013 | George | H04W 72/12 |
| | | | | 455/509 |
| 2014/0012591 | A1* | 1/2014 | Kaboff | G06Q 50/22 |
| | | | | 705/2 |
| 2014/0038656 | A1* | 2/2014 | Navda | G06Q 10/06 |
| | | | | 455/556.2 |
| 2014/0244855 | A1* | 8/2014 | Howes, Jr. | H04N 21/23106 |
| | | | | 709/231 |
| 2014/0362713 | A1* | 12/2014 | Agarwal | H04W 48/17 |
| | | | | 370/252 |
| 2015/0036514 | A1* | 2/2015 | Zhu | H04W 52/38 |
| | | | | 370/252 |
| 2016/0063893 | A1* | 3/2016 | Kanuganti | H04N 21/8545 |
| | | | | 348/62 |
| 2016/0086219 | A1* | 3/2016 | Richardson | G06Q 30/0255 |
| | | | | 705/14.53 |
| 2016/0147944 | A1* | 5/2016 | Douglass | G06F 21/31 |
| | | | | 705/51 |
| 2018/0114148 | A1* | 4/2018 | Balaji | G06Q 10/02 |
| 2020/0280998 | A1* | 9/2020 | Hong | G08C 17/02 |

* cited by examiner

REMOTELY INTERACTING WITH DATABASE

CROSS REFERENCE TO RELATED APPLICATIONS

This application claims the benefit of U.S. Provisional Patent Application Ser. No. 62/753,215, filed Oct. 31, 2018, entitled "REMOTELY INTERACTING WITH DATABASE", the disclosure of which is hereby incorporated by reference.

BACKGROUND

Various aspects of the present invention relate generally to interacting with a database, and more specifically remotely interacting with a database to send updates to data items within the database.

Many industries include a force of employees that are distributed throughout a region, yet data for the industry may be kept in a central location. Thus, the employees may need to access the database remotely.

BRIEF SUMMARY

According to aspects of the present invention, a process and system that allows a user with a mobile device to interact with a remote database includes wirelessly coupling the mobile device to the database over a wireless network using a username. Based on the username, and in some cases a role associated with the username, the database transmits a set of data records to the mobile device in one or more subsets of data records. The user selects one of the records and provides an update that includes an item of some sort (e.g., a photograph, a note to the record, etc.). However, the user cannot delete anything associated with the record. If the update can be transmitted to the database, then the mobile device transmits the update. However, if the update cannot be transmitted, then the update is stored for a later transmission. Once the update is transmitted, it is deleted from the mobile device

DETAILED DESCRIPTION

According to aspects of the present disclosure, a user uses a mobile device to access data records on a remote database without the need for a network browser. The user enters a username (and credentials) to log into the database, and the database sends data records associated with the username to the mobile device. The user may then select a data records and send an update to the data record by adding an item (e.g., photograph, data field entry, etc.) to the data record. The update does not include a change to the data record or a deletion to the data record, only an addition. Thus, the database does not need to lockout the data records that were transmitted to the mobile device.

Networking Overview

Figure 1:
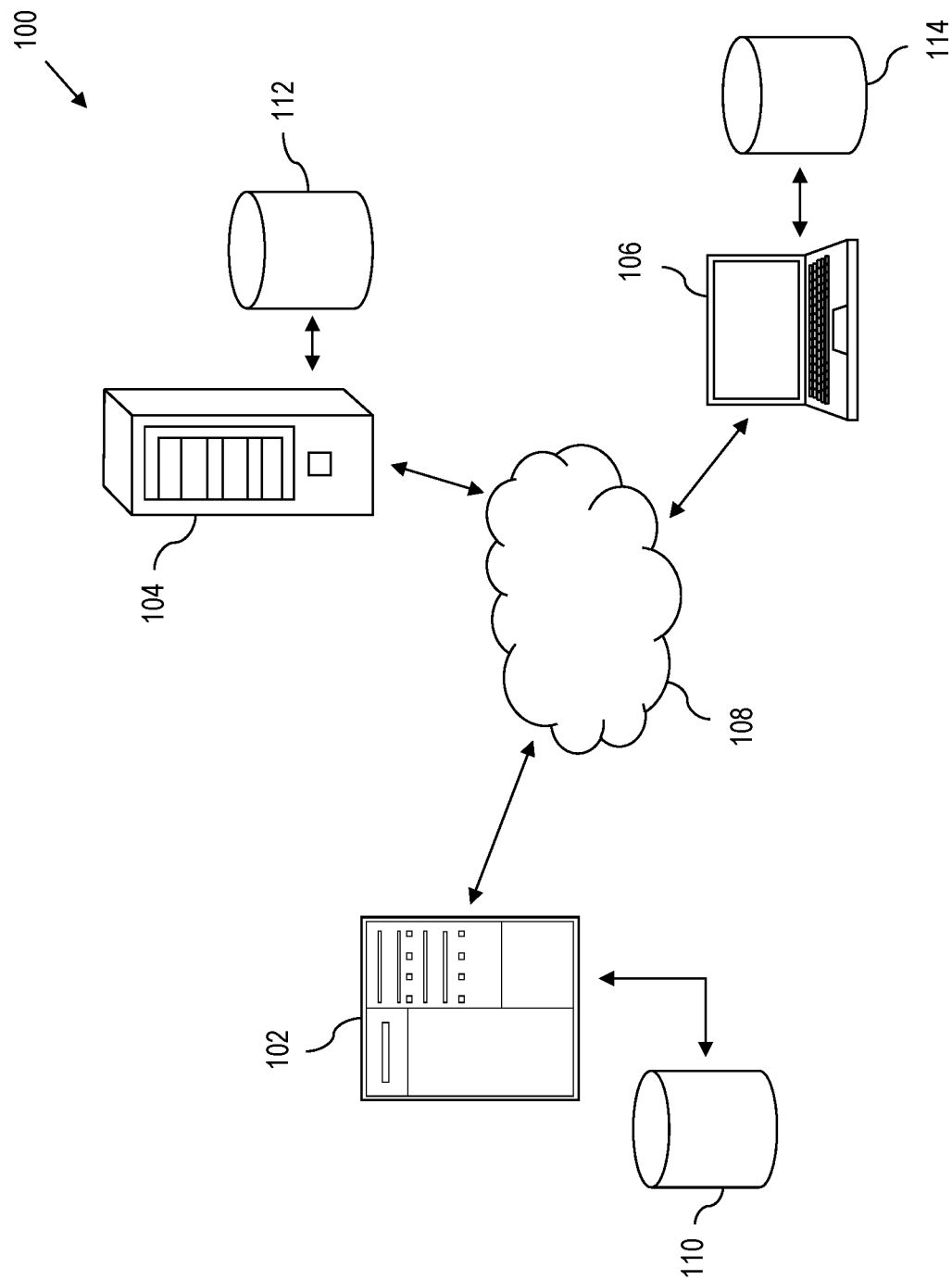
FIG. 1 is a schematic representation of the computing system and network, according to various aspects of the present disclosure.

Referring to drawings and in particular FIG. 1, a network system 100 is illustrated according to aspects of the present disclosure herein. Generally, a processing device designated as a first machine 102 communicates with one or more remote processing devices, e.g., a second machine 104 and a third machine 106, across a network 108. The second machine 104 and third machine 106 are illustrated solely for purposes of simplified explanation. In practice, one or more remote devices may communicate with the first machine 102. The first machine 102 may comprise a mainframe computer, server computer, or other processing device that is capable of responding to data transfer requests, as will be described in greater detail herein. In this regard, the first machine 102 has access to storage 110, e.g., any form of storage, including disk(s), network addressed storage (NAS), file server(s), a cloud-based storage or other structure where data can be retrieved.

The second machine 104 and third machine 106 may each comprise any processing device that is capable of communicating over the network 108 to request and/or receive data from the first machine 102. For instance, typical processing devices include tablets, mobile phones, other lightweight mobile devices, etc. The second machine 104 or third machine 106 may comprise by way of example, transactional systems, purpose-driven appliances, cellular devices including smart telephones, etc.

For purposes of discussion herein, the second machine 104 has access to storage 112 where data received from the first machine 102 is to be stored. Likewise, the third machine 106 has access to storage 114 where data received from the first machine 102 is to be stored.

The network 108 provides communication links between the various processing devices, e.g., the first machine 102, the second machine 104, and the third machine 106. Accordingly, the network 108 may be supported by networking components such as routers, switches, hubs, firewalls, network interfaces, wired or wireless communication links and corresponding interconnections, cellular stations and corresponding cellular conversion technologies, e.g., to convert between cellular and TCP/IP, etc. Such devices are not shown for purposes of clarity. Moreover, the network 108 may comprise connections using one or more intranets, extranets, local area networks (LAN), wide area networks (WAN), wireless networks (WIFI), the Internet, including the world wide web, a cloud, and/or other arrangements for enabling communication between the processing devices, in either real time or otherwise, e.g., via time shifting, batch processing, etc.

The network system 100 is shown by way of illustration, and not by way of limitation, as a computing environment in which various aspects of the present disclosure may be practiced. Other configurations may alternatively be implemented. All of the devices discussed above in reference to the network (e.g., machines, routers, switches, hubs, etc.) are entities within the network.

Remotely Accessing Data Records

Figure 2:
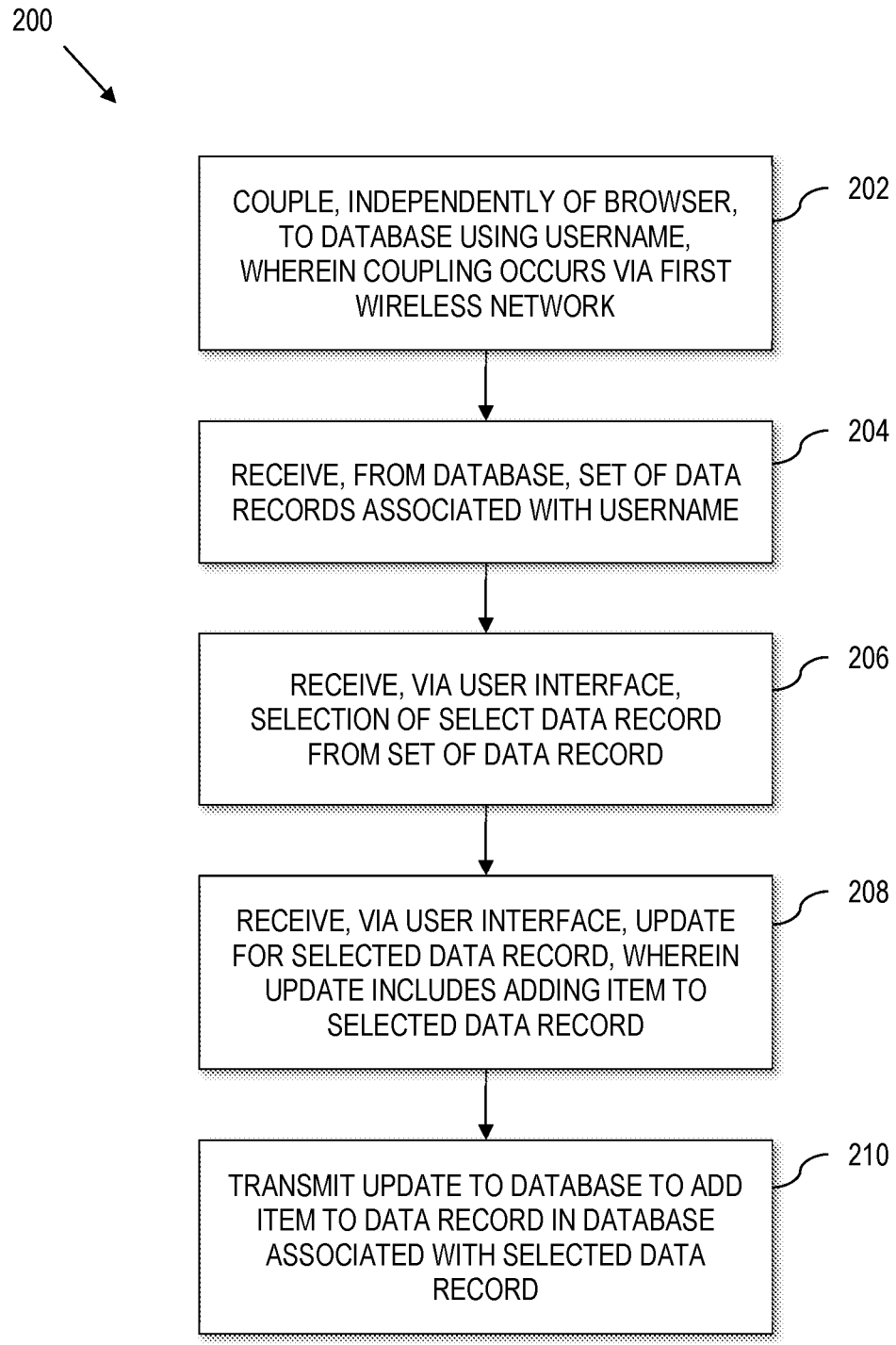
FIG. 2 is a flow chart illustrating a process for remotely interacting with a database, according to various aspects of the present disclosure.

FIG. 2 illustrates a process 200 for interacting remotely with a database. The process may be performed by a mobile device (e.g., smart phone, tablet, etc. similar to the second device 104 of FIG. 1), and the database may be associated with the storage (110, FIG. 1) and the first machine (102, FIG. 1) of FIG. 1.

At 202, the mobile device couples to the database independently of a browser using a username. For example, the mobile device may couple to the database via the network (108, FIG. 1) of FIG. 1. Note that the mobile device couples to the database over a wireless network, even though the network itself may be wired. For example, in FIG. 1 the network (108, FIG. 1) has wireless access points, but much of the network is wired. Thus, the mobile device accesses the network wirelessly, even though the database and portions of the network may be wired.

At 204, a set of data records associated with the username are received from the database. In some embodiments, the set of data records is broken up into a first set of data records and a second set of data records (and possibly more sets of data records). For example, if there are forty data records associated with the username in the database, then twenty data records may be received by the mobile device as the first set of data records, and the last twenty may be received by the mobile device as the second set of data records. The first data set and the second data set (and subsequent data sets) may have an equal or a different number of data records.

Further, if there are multiple sets of data records sent, the transmission/reception of the different data sets may be spaced out based on a user input via a user interface on the mobile device. For example, if the first set of data records is sent, then the second set of data records may not be sent until after the user interacts with the user interface to scroll to an end of the first set of data records (e.g., once the user scrolls to the last data record in the first data set, an instruction will be sent to the database to send the second set of data records). As another example, if the first set of data records is sent, then the second set of data records may not be sent until after the user interacts with the user interface to scroll through a predetermined subset of the first set of data records. For example, if the first set of data records includes twelve data records, once the user scrolls through eight data records, then the signal to send another set of data records is sent to the database. As a further example, if the first set of data records is sent, then the second set of data records may not be sent until after the user interacts with the user interface to scroll through a subset of the first set of data records such that a predetermined number of data records have not been seen by the user. For example, if the first set of data records includes fifteen data records, once the user scrolls through enough data records such that there are six data records that the user has not seen, then the signal to send another set of data records is sent to the database.

In various embodiments, the set of data records received is also associated with a search request received. For example, the mobile device may receive a search request to search data records on the database, and then the mobile device will send the search request to the database, which will perform a search and transmit results of the search to the mobile device as a set of data records.

At 206, a selection of a select data record from the set of data record is received via the user interface. For example, the user may select a data record by tapping the data record via the user interface. As another example, the mobile device may receive a search request to search the set of data records (or multiple sets of data records if multiple sets have been received), and then the mobile device will perform a search of the set of data records and display results of the search for the user. As above, the user may then select a desired data record of the results of the search via the user interface.

At 208, an update for the selected data record is received via the user interface, and the update includes adding an item to the selected data record. The item may be any data (photograph, data entry, etc.) to be added to the data record on the database.

At 210, the update is transmitted to the database to add the item to a data record in the database associated with the selected data record. For example, if the item is a photograph, then the photograph is transmitted to the database for storage with the associated data record on the database. The transmission may be performed using the same wireless network that was used to couple to the database or a different network. For example, if the data records were received over a wireless fidelity (WiFi) network, then the network for transmission may be the WiFi network, a different WiFi network, a cellular network, etc.

The mobile device may transmit the item at the time the user indicates or at a later time. For example, if the mobile device determines that the wireless network for transmission includes a signal strength (or bandwidth) that is within a predetermined threshold, then the update is transmitted to the database. However, if the mobile device determines that the wireless network for transmission includes a signal strength (or bandwidth) that is outside a predetermined threshold, then the update is stored locally on the mobile device for later transmission. In some embodiments, the update is encrypted before being locally stored on the mobile device. If the update is stored locally, then a background process may run that periodically checks the signal strength of the first wireless network, a second wireless network, or both. When a suitable signal strength is found on one of the wireless networks, then that network is used to transmit the update to the database. If the update was encrypted for storage, then the update is decrypted before transmission. Further, the update is then deleted from the local storage of the mobile device.

Example of Remotely Accessing Data Records

A remote agent of an auto insurance corporation that stores data records in a database is required to check on an insurance claim. The agent opens an application having a user interface (where the application is not an internet browser) on his mobile device and enters his username and password. The application on the mobile device couples to the database via a WiFi network and receives seventeen data records in a first set of data records. The agent scrolls through the data records, and when he reaches the thirteenth data record, the application sends a message to the database requesting another set of data records. By the time the agent scrolls to the sixteenth data record of the first set of data records, the second set of data records has been received by the application and are displayed.

The agent knows that the customer associated with the insurance claim is Customer_X, so when the agent finds a data record associated with Customer_X, the agent selects the Customer_X data record via the user interface of the application. The agent opens the data record and finds an address and driving directions associated with Customer_X. The agent arrives at Customer_X's address, and he takes pictures of Customer_X's automobile. The agent chooses two of the photographs as an update to be sent to the database.

However, when the agent hits a send button in the application, the application determines that the signal strength of a local WiFi signal is too low and the signal strength of a local cellular network is too low. Therefore, the application encrypts the two photographs that are the update and stores them locally on the mobile device. Further, the application runs a process that periodically checks the signal strength of wireless networks. When the process finds a wireless network with a strong enough signal strength, the application and mobile device decrypt the photographs for the update, send the update (which includes the photographs), then deletes the update and photographs from the local storage of the mobile device.

The systems and processes described herein are improvements to interacting databases, because multiple people can access data records from the database without the database being required to lock out the data record. Further, if an update cannot be sent to the database, the user is not forced to retry sending the update at a later time. Instead, the mobile device finds a time when the signal strength of a network is within an acceptable range and sends the update at that time.

Miscellaneous

Figure 3:
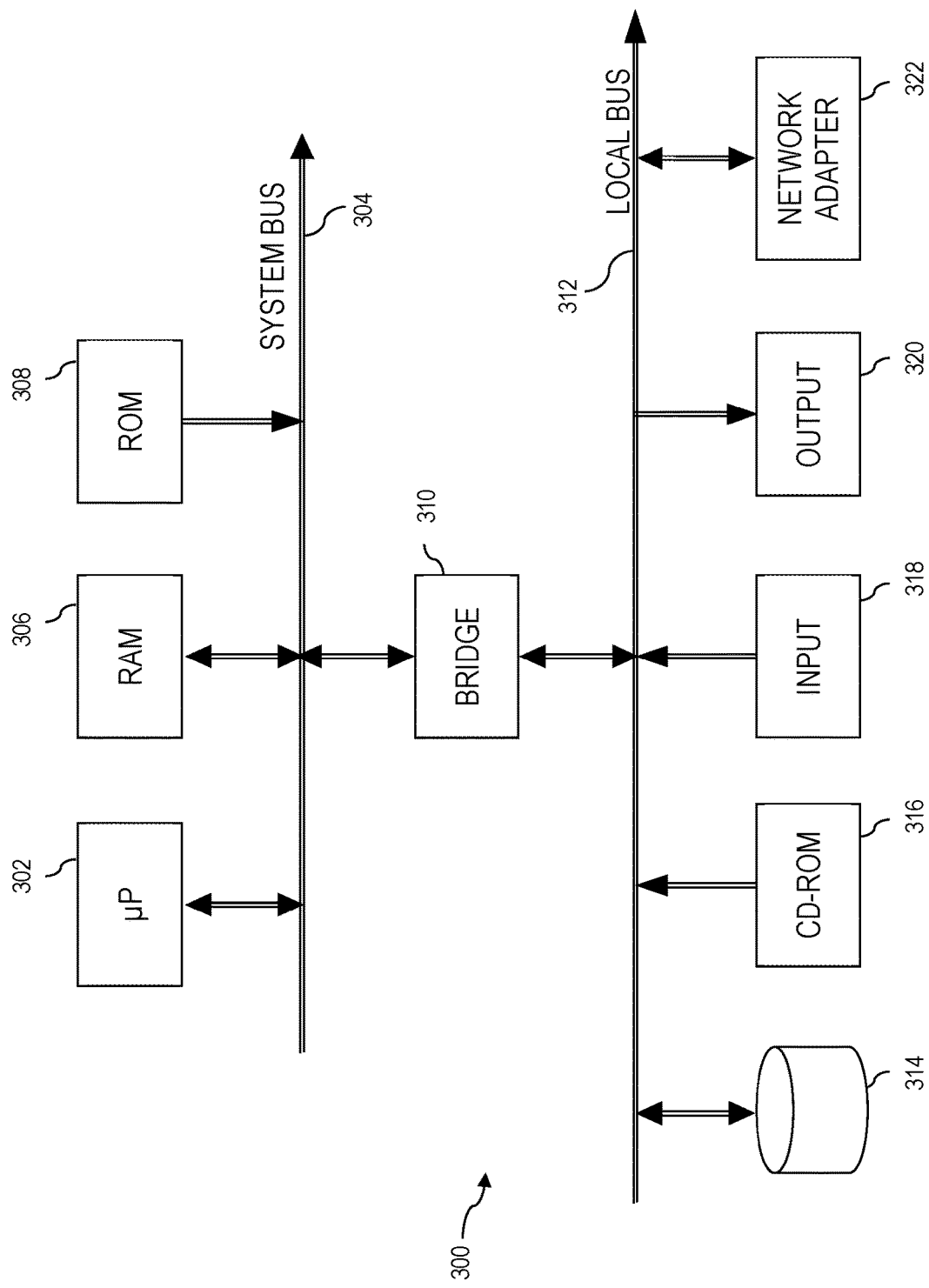
FIG. 3 is a block diagram of a computer system having a computer readable storage medium for implementing functions according to various aspects of the present invention as described in greater detail herein.

Referring to FIG. 3, a block diagram of a hardware data processing system is depicted in accordance with the present disclosure. Data processing system 300 may comprise a symmetric multiprocessor (SMP) system or other configuration including a plurality of processors 302 connected to system bus 304. Alternatively, a single processor 302 may be employed. Also connected to the system bus 304 is local memory, e.g., RAM 306 and/or ROM 308. An I/O bus bridge 310 interfaces the system bus 304 to an I/O bus 312. The I/O bus 312 is utilized to support one or more buses and corresponding devices, such as storage 314, removable media storage 516, input devices 318, output devices 320, network adapters 322, other devices, combinations thereof, etc. For instance, a network adapter 322 can be used to enable the data processing system 300 to communicate with other data processing systems or remote printers or storage devices through intervening private or public networks.

The memory 306, 308, storage 314, removable media storage 316, or combinations thereof can be used to store program code that is executed by the processor(s) 302 to implement any aspect of the present disclosure described and illustrated in the preceding figures.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A process for interacting remotely with a database, the process comprising:
   coupling, independently of a browser, a mobile device to a remote server running a database using a username, wherein the coupling occurs via a first wireless network;
   receiving, from the database, a set of data records associated with the username;
   receiving, via a user interface, a selection of a select data record from the set of data record;
   receiving, via the user interface, an update for the selected data record, wherein the update includes adding an item to the selected data record; and
   transmitting the update to the database to add the item to a data record in the database associated with the selected data record by:
   determining a signal strength of the first wireless network for transmission;
   transmitting the update to the database when the signal strength of the first wireless network for transmission is within a predetermined threshold;
   transmitting the update to the database using a second wireless network when a signal strength of the second wireless network is within a predetermined threshold, wherein the second wireless network uses a different protocol than the first wireless network; and
   storing the update locally in memory of the mobile device when the signal strength of the first wireless network and the second wireless network for transmission are not within a predetermined threshold.

2. The process of claim 1, wherein receiving, from the database, a set of data records associated with the username comprises:
   receiving, from the database, a first set of data records associated with the username; and
   receiving, from the database, a second set of data records associated with the username, wherein receiving the second set of data records occurs after receiving an input via the user interface.

3. The process of claim 2, wherein receiving the second set of data records occurs after receiving an input via the user interface comprises receiving the second set of data records occurs after a user scrolls, via the user interface, to an end of the first set of data records.

4. The process of claim 2, wherein receiving the second set of data records occurs after receiving an input via the user interface comprises receiving the second set of data records occurs after a user scrolls, via the user interface, through a predetermined subset of the first set of data records.

5. The process of claim 1 further comprising:
   receiving, via the user interface, a search request to search the set of data records;
   searching the first set of data records based on the received search request; and
   displaying results of the search of the first set of data records based on the received search request.

6. The process of claim 1 further comprising:
   receiving, via the user interface and before receiving the set of data records, a search request to search data records stored on the database; and
   sending the search request to the database;
   wherein receiving the set of data records associated with the username is further based on the search request.

7. The process of claim 1, wherein transmitting the update to the database when the signal strength of the wireless network for transmission is within a predetermined threshold comprises:
   running a background process that periodically checks a signal strength of the first wireless network; and
   transmitting the update to the database when the signal strength of the first wireless network is within a predetermined threshold.

8. The process of claim 1, wherein transmitting the update to the database further comprises deleting the locally stored update after the update is transmitted to the database.

9. The process of claim 1, wherein storing the update locally database when the signal strength of the wireless network for transmission is not within a predetermined threshold further comprises encrypting the update before storing the update.

10. A system for interacting remotely with a database, the system comprising a processor coupled to memory that includes a program that instructs the processor to perform:
    coupling, independently of a browser, a mobile device on which the processor resides to a remote server running a database using a username, wherein the coupling occurs via a first wireless network;
    receiving, from the database, a set of data records associated with the username;
    receiving, via a user interface, a selection of a select data record from the set of data record;
    receiving, via the user interface, an update for the selected data record, wherein the update includes adding an item to the selected data record; and
    transmitting the update to the database to add the item to a data record in the database associated with the selected data record by:
        determining a signal strength of the first wireless network for transmission;
        transmitting the update to the database when the signal strength of the first wireless network for transmission is within a predetermined threshold;
        transmitting the update to the database using a second wireless network when a signal strength of the second wireless network is within a predetermined threshold, wherein the second wireless network uses a different protocol than the first wireless network; and
        storing the update locally in memory of the mobile device when the signal strength of the first wireless network and the second wireless network for transmission are not within a predetermined threshold.

11. The system of claim 10, wherein receiving, from the database, a set of data records associated with the username comprises:
    receiving, from the database, a first set of data records associated with the username; and
    receiving, from the database, a second set of data records associated with the username, wherein receiving the second set of data records occurs after receiving an input via the user interface.

12. The system of claim 11, wherein receiving the second set of data records occurs after receiving an input via the user interface comprises receiving the second set of data records occurs after a user scrolls, via the user interface, to an end of the first set of data records.

13. The system of claim 11, wherein receiving the second set of data records occurs after receiving an input via the user interface comprises receiving the second set of data records occurs after a user scrolls, via the user interface, through a predetermined subset of the first set of data records.

14. The system of claim 10 further comprising:
    receiving, via the user interface and before receiving the set of data records, a search request to search data records stored on the database; and
    sending the search request to the database;
    wherein receiving the set of data records associated with the username is further based on the search request.

15. The system of claim 10, wherein transmitting the update to the database further comprises deleting the locally stored update after the update is transmitted to the database.

16. The system of claim 10, wherein storing the update locally database when the signal strength of the wireless network for transmission is not within a predetermined threshold further comprises encrypting the update before storing the update.

* * * * *